(12) United States Patent
Zeng et al.

(10) Patent No.: US 11,693,646 B2
(45) Date of Patent: Jul. 4, 2023

(54) PLACE CHANGE DRIVEN SOFTWARE UPDATE METHOD AND APPARATUS, AND READABLE STORAGE MEDIUM

(71) Applicant: TONGJI UNIVERSITY, Shanghai (CN)

(72) Inventors: Guosun Zeng, Shanghai (CN); Chaoze Lu, Shanghai (CN); Chunling Ding, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/351,145

(22) Filed: Jun. 17, 2021

(65) Prior Publication Data

US 2022/0164176 A1 May 26, 2022

(30) Foreign Application Priority Data

Nov. 22, 2020 (CN) .......................... 202011315914.9

(51) Int. Cl.
*G06F 8/65* (2018.01)
*G06F 16/901* (2019.01)

(52) U.S. Cl.
CPC ............ *G06F 8/65* (2013.01); *G06F 16/9024* (2019.01)

(58) Field of Classification Search
CPC ................................ G06F 8/65; G06F 16/9024
USPC .................................................. 717/100–105
See application file for complete search history.

(56) References Cited

U.S. PATENT DOCUMENTS

| 2009/0043790 A1* | 2/2009 | Holster ............... G06F 16/9027 |
| 2015/0169758 A1* | 6/2015 | Assom .................... G06F 16/36 |
| | | 707/603 |

\* cited by examiner

*Primary Examiner* — Chuck O Kendall
(74) *Attorney, Agent, or Firm* — JCIP Global Inc.

(57) ABSTRACT

The present invention relates to a place change driven software update method and apparatus, and a readable storage medium. The method includes: modeling a software architecture SA and an evolution rule set L⇒R through Bigraph; acquiring a software architecture $SA^t$ after movement and before evolution of the SA; computing a place $\Delta P$ that changes between the SA and the $SA^t$, thereby acquiring a corresponding evolution rule $L_j \to R_j$; and cutting a matching subgraph $G^L$ on a link graph $SA^L$ and replacing with a link graph $R_j^L$ to obtain a new SA link graph $SA^{L,e}$; and merging the new SA place graph and the new SA link graph, thereby implementing update of the software architecture. Compared with the prior art, the present invention may describe place change information and system change information at the same time, and avoid the complexity, risk, unreliability and the like of conversion between different models.

10 Claims, 1 Drawing Sheet

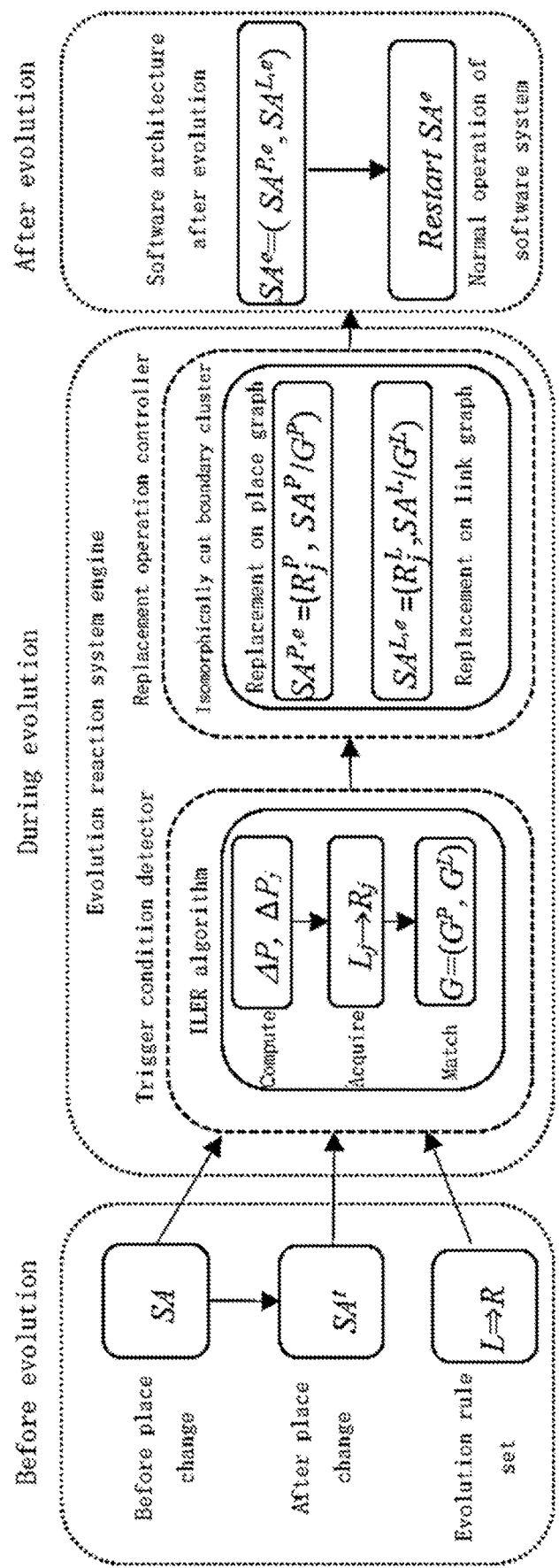

PLACE CHANGE DRIVEN SOFTWARE UPDATE METHOD AND APPARATUS, AND READABLE STORAGE MEDIUM

CROSS-REFERENCE TO RELATED APPLICATION

This application claims the priority benefit of China application serial no. 202011315914.9, filed on Nov. 22, 2020. The entirety of the above-mentioned patent application is hereby incorporated by reference herein and made a part of this specification.

BACKGROUND

Technical Field

The present invention relates to the field of software update, and in particular to a place change driven software update method and apparatus, and a readable storage medium.

Description of Related Art

At present, in the field of software engineering, the software update mainly arises from the requirement and environment change, which leads to a requirement change driven software dynamic evolution method and an environment change driven software dynamic evolution method.

The requirement change driven software dynamic evolution method mainly focuses on functional requirements and non-functional requirements, respectively describes a requirement change model and a software system change model with the Unified Modeling Language (UML), process algebra, graph and other semi-formal or formal languages, and then associates with the two models in the unified language description; and thus, the requirement change driven system model also changes.

The environment change driven software dynamic evolution method mainly focuses on software environments and hardware environments, respectively describes an environment change model and a software system change model with the Architecture Description Language (ADL), process algebra, Petri network, graph and other semi-formal or formal languages, and then associates with the two models in the unified language description; and thus, the environment change driven system model also changes.

In a case where the place change driven software evolution is implemented, the place change model can only be described with one modeling language, and then the software system model is described with another modeling language; and the two models must be associated with an intermediary language. However, there are many risks, for examples, the error risk that one language is converted into another language, the risk that one language cannot be completely converted into another language, the risk that the intrinsic implicit information of the language is captured difficultly, and so on.

Presently, neither the requirement change driven software dynamic evolution method driven requirement change nor the environment change driven software dynamic evolution method can describe the place change model and the software system model at the same time.

To sum up, existing methods fail to focus on the technology that the place change leads to the software evolution, and are hard to meet and adapt to requirements of such new-generation software systems as the mobile system, Internet-of-things system and cyber-physical system on evolution of the place change driven system.

SUMMARY

In order to overcome the defects in the prior art, an objective of the present invention is to provide a place change driven software update method and apparatus that may describe place change information and system change information at the same time, and a readable storage medium.

The objective of the present invention may be implemented via the following solutions:

A place change driven software update method includes the following steps:

modeling a software architecture SA and a corresponding evolution rule set L⇒R through Bigraph;

acquiring a software architecture $SA^t$ after movement and before evolution of the software architecture SA;

computing a place $\Delta P$ that changes between the SA and the $SA^t$; and acquiring a set $\{\Delta P_1, \Delta P_2, \ldots, \Delta P_n\}$ for all change places in the corresponding evolution rule set L⇒R;

determining whether the place $\Delta P$ belongs to the place set $\{\Delta P_1, \Delta P_2, \ldots, \Delta P_n\}$, and ending the method if no, or otherwise, acquiring a corresponding matching place $\Delta P_j$ of the place $\Delta P$, thereby acquiring a corresponding evolution rule $L_j \rightarrow R_j$;

respectively computing a place graph $L_j^P$ and a link graph $L_j^L$ according to the $L_j$, respectively computing a place graph $SA^P$ and a link graph $SA^L$ according to the software architecture SA, acquiring a matching subgraph $G^P$ of the place graph $L_j^P$ in the place graph $SA^P$, and acquiring a matching subgraph $G^L$ of the link graph $L_j^L$ in the link graph $SA^L$;

respectively computing a place graph $R_j^P$ and a link graph $R_j^L$ according to the $R_j$, respectively cutting the matching subgraph $G^P$ on the place graph $SA^P$ with an isomorphically cut boundary cluster and replacing with the place graph $R_j^P$ to obtain a new SA place graph $SA^{P,e}$, and cutting the matching subgraph $G^L$ on the link graph $SA^L$ and replacing with the link graph $R_j^L$ to obtain a new SA link graph $SA^{L,e}$; and merging the new SA place graph $SA^{P,e}$ and the new SA link graph $SA^{L,e}$ to obtain an evolved software architecture $SA^e$, thereby implementing update of the software architecture SA.

Further, acquiring the new place graph $SA^{P,e}$ is specifically as follows:

cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation.

Further, acquiring the new place graph $SA^{P,e}$ is specifically as follows:

cutting the matching subgraph $G^L$ from the link graph $SA^L$, labeling a rest portion as $SA^L/G^L$, determining whether the link graph $R_j^L$ of the $R_j$ and the $G^L$ have an isomorphically cut boundary cluster, and replacing the $R_j^L$ to the $SA^L/G^L$ if yes to acquire the new SA link graph $SA^{L,e}$, or otherwise, not performing replacement operation.

Further, whether the evolution is triggered is determined with an ILER algorithm, thereby computing the place $\Delta P$ that changes between the SA and the $SA^t$.

The present invention further provides a place change driven software update system, which includes:

an evolution rule matching module, configured to: model a software architecture SA and a corresponding evolution rule set L⇒R through Bigraph;

acquire a software architecture $SA^t$ after movement and before evolution of the software architecture SA;

compute a place ΔP that changes between the SA and the $SA^t$; and acquire a place set {$ΔP_1, ΔP_2, \ldots, ΔP_n$} for all change places in the corresponding evolution rule set L⇒R; and determine whether the place ΔP belongs to the place set {$ΔP_1, ΔP_2, \ldots, ΔP_n$}, and end the method if no, or otherwise, acquire a corresponding matching place $ΔP_j$ of the place ΔP, thereby acquiring a corresponding evolution rule $L_j{\rightarrow}R_j$;

a place graph and link graph replacement module, configured to: respectively compute a place graph $L_j^P$ and a link graph $L_j^L$ according to the $L_j$, respectively compute a place graph $SA^P$ and a link graph $SA^L$ according to the software architecture SA, acquire a matching subgraph $G^P$ of the place graph $L_j^P$ in the place graph $SA^P$, and acquire a matching subgraph $G^L$ of the link graph $L_j^L$ in the link graph $SA^L$; and respectively compute a place graph $R_j^P$ and a link graph $R_j^L$ according to the $R_j$, respectively cut the matching subgraph $G^P$ on the place graph $SA^P$ with an isomorphically cut boundary cluster and replace with the place graph $R_j^P$ to obtain a new SA place graph $SA^{P,e}$, and cut the matching subgraph $G^L$ on the link graph $SA^L$ and replace with the link graph $R_j^L$ to obtain a new SA link graph $SA^{L,e}$; and a software update module, configured to: merge the new SA place graph $SA^{P,e}$ and the new SA link graph $SA^{L,e}$ to obtain an evolved software architecture $SA^e$, thereby implementing update of the software architecture SA.

Further, acquiring the new place graph $SA^{P,e}$ is specifically as follows:

cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation.

Further, acquiring the new place graph $SA^{P,e}$ is specifically as follows:

cutting the matching subgraph $G^L$ from the link graph $SA^L$, labeling a rest portion as $SA^L/G^L$, determining whether the link graph $R_j^L$ of the $G^L$ and the $G^L$ have an isomorphically cut boundary cluster, and replacing the $R_j^P$ to the $SA^L/G^L$ if yes to acquire the new SA link graph $SA^{L,e}$, or otherwise, not performing replacement operation.

Further, whether the evolution is triggered is determined with an ILER algorithm, thereby computing the place ΔP that changes between the SA and the $SA^t$.

The present invention further provides a computer readable storage medium, which stores a computer program thereon, wherein the computer program implements the following steps when executed by a processor:

modeling a software architecture SA and a corresponding evolution rule set L⇒R through Bigraph;

acquiring a software architecture $SA^t$ after movement and before evolution of the software architecture SA;

computing a place ΔP that changes between the SA and the $SA^t$; and acquiring a place set {$ΔP_1, ΔP_2, \ldots, ΔP_n$} for all change places in the corresponding evolution rule set L⇒R;

determining whether the place ΔP belongs to the place set {$ΔP_1, ΔP_2, \ldots, ΔP_n$}, and ending the method if no, or otherwise, acquiring a corresponding matching place $ΔP_j$ of the place ΔP, thereby acquiring a corresponding evolution rule $L_j{\rightarrow}R_j$;

respectively computing a place graph $L_j^P$ and a link graph $L_j^L$ according to the $L_j$, respectively computing a place graph $SA^P$ and a link graph $SA^L$ according to the software architecture SA, acquiring a matching subgraph $G^P$ of the place graph $L_j^P$ in the place graph $SA^P$, and acquiring a matching subgraph $G^L$ of the link graph $L_j^L$ in the link graph $SA^L$;

respectively computing a place graph $R_j^P$ and a link graph $R_j^L$ according to the $R_j$, respectively cutting the matching subgraph $G^P$ on the place graph $SA^P$ with an isomorphically cut boundary cluster and replacing with the place graph $R_j^P$ to obtain a new SA place graph $SA^{P,e}$, and cutting the matching subgraph $G^L$ on the link graph $SA^L$ and replace with the link graph $R_j^L$ to obtain a new SA link graph $SA^{L,e}$, and merging the new SA place graph $SA^{P,e}$ and the new SA link graph $SA^{L,e}$ to obtain an evolved software architecture $SA^e$, thereby implementing update of the software architecture SA.

Further, acquiring the new place graph $SA^{P,e}$ is specifically as follows:

cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation; and acquiring the new place graph $SA^{P,e}$ is specifically as follows:

cutting the matching subgraph $G^L$ from the link graph $SA^L$, labeling a rest portion as $SA^L/G^L$, determining whether the link graph $R_j^L$ of the $R_j$ and the $G^L$ have an isomorphically cut boundary cluster, and replacing the $R_j^L$ to the $SA^L/G^L$ if yes to acquire the new SA link graph $SA^{L,e}$, or otherwise, not performing replacement operation.

Compared with the prior art, the present invention has the following advantages:

(1) With the full utilization of the Bigraph that has the characteristics of both the place graph and the link graph, the method uniformly describes the place information, system link information, and evolution rule information for guiding dynamic evolution with the Bigraph under the same modeling language framework, such that all system evolved information may be described with the uniform model; and compared with conventional methods that a plurality of models are associated for conversion, the complexity, risk, unreliability of conversion between different models are avoided.

Furthermore, the present invention also makes up the shortages and difficult description situations of conventional requirement and environment driven dynamic evolution methods in description of the place information, and creates the dynamic evolution method that more focuses on place driving in such new-generation software systems as the mobile system, Internet-of-things system and cyber-physical system.

BRIEF DESCRIPTION OF THE DRAWINGS

FIG. 1 is a schematic diagram of a complete process of a place change driven software update method according to the present invention.

DESCRIPTION OF THE EMBODIMENTS

The present invention will be further described below in detail in conjunction with the accompanying drawings and specific embodiments. The embodiments are implemented on the basis of the technical solutions of the present invention, and offer the detailed implementation manners and specific operation process. However, the scope of protection of the present invention is not limited to the following embodiments.

Embodiment 1

The embodiment provides a place change driven software update method, which includes the following steps:

A software architecture SA and a corresponding evolution rule set L⇒R are modeled through Bigraph.

A software architecture $SA^t$ after movement and before evolution of the software architecture SA is acquired.

A place ΔP that changes between the SA and the $SA^t$ is computed; and a place set $\{\Delta P_1, \Delta P_2, \ldots, \Delta P_n\}$ for all change places in the corresponding evolution rule set L⇒R is acquired.

Whether the place ΔP belongs to the place set $\{\Delta P_1, \Delta P_2, \ldots, \Delta P_n\}$ is determined, and the method is ended if no, or otherwise, a corresponding matching place $\Delta P_j$ of the place ΔP is acquired, thereby acquiring a corresponding evolution rule $L_j \to R_j$.

A place graph $L_j^P$ and a link graph $L_j^L$ are respectively computed according to the $L_j$, a place graph $SA^P$ and a link graph $SA^L$ are respectively computed according to the software architecture SA, a matching subgraph $G^P$ of the place graph $L_j^P$ is acquired in the place graph $SA^P$, and a matching subgraph $G^L$ of the link graph $L_j^L$ is acquired in the link graph $SA^L$.

A place graph $R_j^P$ and a link graph $R_j^L$ are respectively computed according to the $R_j$, the matching subgraph $G^P$ is respectively cut on the place graph $SA^P$ with an isomorphically cut boundary cluster and replaced with the place graph $R_j^P$ to obtain a new SA place graph $SA^{P,e}$, and the matching subgraph $G^L$ is cut on the link graph $SA^L$ and replaced with the link graph $R_j^L$ to obtain a new SA link graph $SA^{L,e}$.

The new SA place graph $SA^{P,e}$ and the new SA link graph $SA^{L,e}$ are merged to obtain an evolved software architecture $SA^e$, thereby implementing update of the software architecture SA.

Acquiring the new place graph $SA^{P,e}$ is specifically as follows:

The matching subgraph $G^P$ is cut from the place graph $SA^P$, a rest portion is recorded as $SA^P/G^P$, whether the place graph $R_j^P$ of the $R_j$ and the $G^P$ have an isomorphically cut boundary cluster is determined, and the $R_j^P$ is replaced to the $SA^P/G^P$ if yes to acquire the new SA place graph $SA^{P,e}$, or otherwise, replacement operation is not performed.

Acquiring the new link graph $SA^{P,e}$ is specifically as follows:

The matching subgraph $G^L$ is cut from the link graph $SA^L$, a rest portion is recorded as $SA^L/G^L$, whether the link graph $R_j^L$ of the $R_j$ and the $G^L$ have an isomorphically cut boundary cluster is determined, and the $R_j^L$ is replaced to the $SA^L/G^L$ if yes to acquire the new SA link graph $SA^{L,e}$, or otherwise, replacement operation is not performed.

Whether the evolution is triggered is determined with an ILER algorithm, thereby computing the place ΔP that changes between the SA and the $SA^t$.

The descriptions will be made below to the specific implementation process in the embodiment.

1. Introductions on Basic Concepts

The software architecture having place information consists of a group of components, a link relationship between the components, and places where the components are located. The software architecture is modeled with Bigraph in the present invention, and represented as SA=(C, K, A, P, $E_P$, $E_L$, Cons). The place graph of the SA is $SA^P$=(C, K, P, $E_P$, Cons), and the link graph of the SA is $SA^L$=(C, K, A, $E_L$, Cons). C represents a set of the components; K represents a control set of the components, that is, a type set of the components; A represents a port set, and A=($A_i$, $A_o$), $A_i$ and $A_o$ respectively representing an input port set and an output port set; P=($P_e$, $P_r$, $C_m$), $P_e$ representing a set of place nodes, $P_r$ representing a place relationship between place nodes $P_e$, and these place relationships having four types of being independent, parallel, nested and intersected and being respectively represented by *, |, ⊃ and ∩, $C_m$ being a mapping relationship from the component set C to the place set $P_e$, and representing a place where each component is located; $E_P$ represents an edge set between the place nodes, between the place node and the component node, and between the component nodes; $E_L$ represents an edge set between ports of link components; and Cons represents a constrained relationship set of the structure. The software evolution rule $L_i \to R_i$ is also respectively described with the subgraphs of the Bigraph, and labeled as $L_i$=($C^L$, $K^L$, $A^L$, $P^L$, $E_P^L$, $E_L^L$, $Cons^L$), and $R_i$=($C^R$, $K^R$, $A^R$, $P^R$, $E_P^R$, $E_L^R$, $Cons^R$). The evolution rule is a conversion process from one subgraph of the Bigraph to another subgraph of the Bigraph. All evolution rules are represented as L⇒R=$\{L_1 \to R_1, L_2 \to R_2, \ldots, L_n \to R_n\}$.

2. Descriptions on Overall Technical Solutions

As shown in FIG. 1, first of all, the software architecture and the evolution rule are respectively modeled through Bigraph to obtain a software architecture SA before movement, a software architecture $SA^t$ after movement and before evolution of the SA, and a group of preset evolution rule sets L⇒R=$\{L_1 \to L_2 \to R_2, \ldots, L_n \to R_n\}$; whether the evolution is triggered is determined with an ILER algorithm (that is, an identification algorithm on the left of the evolution rule), the difference between the SA and the $SA^t$ is computed as ΔP, $\{\Delta P_1, \Delta P_2, \ldots, \Delta P_n\}$ of all evolution rules is then computed, $\Delta P_j$ corresponding to the ΔP is found in the set, the available evolution rule $L_j \to R_j$ is founded reversely through the $\Delta P_j$, and subgraphs $G^P$ and $G^L$ of the left $L_j$ of the evolution rule are respectively matched on the place graph and link graph of the SA; then the matching subgraph $G^P$ is cut on the place graph $SA^P$ with an isomorphically cut boundary cluster and replaced with $R_j^P$ to obtain a new place graph $SA^{P,e}$, and the matching subgraph $G^L$ is cut on the link graph $SA^L$ and then replaced with $R_j^L$ to obtain a new link graph $SA^{L,e}$, and at last, the $SA^{P,e}$ and the $SA^{L,e}$ are synthesized to obtain the software architecture $SA^{L,e}$ after evolution due to movement, thereby completing SA→$SA^e$; and thereafter, the software system continuously keeps normal operation under the $SA^e$.

3. Detailed Steps

The specific steps of the algorithm are as follows:

Step 1: a software architecture $SA^t$=($C^t$, $K^t$, $A^t$, $P^t$, $E_P^t$, $E_L^t$, $Cons^t$) before some modules move but are not evolved is acquired from SA.

Step 2: place graphs $SA^P$ and $SA^{P,t}$ are respectively computed through the SA and the $SA^t$, and a place ΔP is computed from the $SA^P$ and the $SA^{P,t}$ through a graph difference method.

Step 3: for any evolution rule $L_i \to R_i$ among all evolution rules L⇒R=$\{L_1 \to R_1, L_2 \to R_2, \ldots, L_n \to R_n\}$, a place graph is also respectively used to compute a change place $\Delta P_i$, thereby acquiring a change place set $\{\Delta P_1, \Delta P_2, \ldots, \Delta P_n\}$ for all change places in the L⇒R.

Step 4: whether the ΔP belongs to the change place set $\{\Delta P_1, \Delta P_2, \ldots, \Delta P_n\}$ is determined; if the ΔP does not belong to the change place set, it is indicated that no evolution rule is set on the place ΔP, the evolution cannot be performed and the evolution is ended; or otherwise, the ΔP belongs to the change place set, a corresponding matching place $\Delta P_j$ is acquired, and a corresponding evolution rule $L_j \rightarrow R_j$ is reversely acquired in the L⇒R from the $\Delta P_j$.

Step 5: for the $L_j$, a place graph $L_j^P$ and a link graph $L_j^L$ are respectively computed, a matching subgraph $G^P$ of the $L_j^P$ is acquired in the $SA^P$ in a graph matching method, and a matching subgraph $G^L$ of the $L_j^L$ is acquired in the $SA^L$ in a hypergraph matching method.

Step 6: the $G^P$ is cut from the $SA^P$, a rest portion is labeled as $SA^P/G^P$, whether the place graph $R_j^P$ of the $R_j$ and the $G^P$ have an isomorphically cut boundary cluster is determined, and the $R_j^P$ is replaced to the $SA^P/G^P$ if yes to acquire a new SA place graph $SA^{P,e}$, or otherwise, replacement operation is not performed.

Step 7: the $G^L$ is cut from the $SA^L$, a rest portion is labeled as $SA^P/G^P$, whether the link graph $R_j^L$ of the $R_j$ and the $G^L$ have an isomorphically cut boundary cluster is determined, and the $R_j^L$ is replaced to the $SA^L/G^L$ if yes to acquire a new SA link graph $SA^{L,e}$, or otherwise, replacement operation is not performed.

Step 8: at last, the new place graph $SA^{P,e}$ and the new link graph $SA^{L,e}$ are merged to obtain an evolved software architecture $SA^e$.

The embodiment further provides a place change driven software update system, which includes:

an evolution rule matching module, configured to: model a software architecture SA and a corresponding evolution rule set L⇒R through Bigraph;

acquire a software architecture $SA^t$ after movement and before evolution of the software architecture SA;

compute a place ΔP that changes between the SA and the $SA^t$; and acquire a place set $\{\Delta P_1, \Delta P_2, \ldots, \Delta P_n\}$ for all change places in the corresponding evolution rule set L⇒R; and determine whether the place ΔP belongs to the place set $\{\Delta P_1, \Delta P_2, \ldots, \Delta P_n\}$, and end the method if no, or otherwise, acquire a corresponding matching place $\Delta P_j$ of the place ΔP, thereby acquiring a corresponding evolution rule $L_j \rightarrow R_j$;

a place graph and link graph replacement module, configured to: respectively compute a place graph $L_j^P$ and a link graph $L_j^L$ according to the $L_j$, respectively compute a place graph $SA^P$ and a link graph $SA^L$ according to the software architecture SA, acquire a matching subgraph $G^P$ of the place graph $L_j^P$ in the place graph $SA^P$, and acquire a matching subgraph $G^L$ of the link graph $L_j^L$ in the link graph $SA^L$; and respectively compute a place graph $R_j^P$ and a link graph $R_j^L$ according to the $R_j$, respectively cut the matching subgraph $G^P$ on the place graph $SA^P$ with an isomorphically cut boundary cluster and replace with the place graph $R_j^P$ to obtain a new SA place graph $SA^{P,e}$, and cut the matching subgraph $G^L$ on the link graph $SA^L$ and replace with the link graph $R_j^L$ to obtain a new SA link graph $SA^{L,e}$, and a software update module, configured to: merge the new SA place graph $SA^{P,e}$ and the new SA link graph $SA^{L,e}$ to obtain an evolved software architecture $SA^e$, thereby implementing update of the software architecture SA.

Acquiring the new place graph $SA^{P,e}$ is specifically as follows:

The matching subgraph $G^P$ is cut from the place graph $SA^P$, a rest portion is recorded as $SA^P/G^P$, whether the place graph $R_j^P$ of the $R_j$ and the $G^P$ have an isomorphically cut boundary cluster is determined, and the $R_j^P$ is replaced to the $SA^P/G^P$ if yes to acquire the new SA place graph $SA^{P,e}$, or otherwise, replacement operation is not performed.

Acquiring the new place graph $SA^{P,e}$ is specifically as follows:

The matching subgraph $G^L$ is cut in the link graph $SA^L$, a rest portion is recorded as $SA^L/G^L$, whether the link graph $R_j^L$ of the $R_j$ and the $G^L$ have an isomorphically cut boundary cluster is determined, and the $R_j^L$ is replaced to the $SA^L/G^L$ if yes to acquire the new SA link graph $SA^{L,e}$, or otherwise, replacement operation is not performed.

Whether the evolution is triggered is determined with an ILER algorithm, thereby computing the place ΔP that changes between the SA and the $SA^t$.

The embodiment further provides a computer readable storage medium, which stores a computer program thereon, wherein the computer program implements the following steps when executed by a processor:

A software architecture SA and a corresponding evolution rule set L⇒R are modeled through Bigraph.

A software architecture $SA^t$ is acquired after movement and before evolution of the software architecture SA.

A place ΔP that changes between the SA and the $SA^t$ is computed; and a place set $\{\Delta P_1, \Delta P_2, \ldots, \Delta P_n\}$ for all change places in the evolution rule set L⇒R is acquired.

Whether the place ΔP belongs to the place set $\{\Delta P_1, \Delta P_2, \ldots, \Delta P_n\}$ is determined, and the method is ended if no, or otherwise, a corresponding matching place $\Delta P_j$ of the place ΔP is acquired, thereby acquiring a corresponding evolution rule $L_j \rightarrow R_j$.

A place graph $L_j^P$ and a link graph $L_j^L$ are respectively computed according to the $L_j$, a place graph $SA^P$ and a link graph $SA^L$ are respectively computed according to the software architecture SA, a matching subgraph $G^P$ of the place graph $L_j^P$ is acquired in the place graph $SA^P$, and a matching subgraph $G^L$ of the link graph $L_j^L$ in the link graph $SA^L$ is acquired.

A place graph $R_j^P$ and a link graph $R_j^L$ are respectively computed according to the $R_j$, the matching subgraph $G^P$ on the place graph $SA^P$ is respectively cut with an isomorphically cut boundary cluster and replaced with the place graph $R_j^P$ to obtain a new SA place graph $SA^{P,e}$, and the matching subgraph $G^L$ on the link graph $SA^L$ is cut and replaced with the link graph $R_j^L$ to obtain a new SA link graph $SA^{L,e}$.

The new SA place graph $SA^{P,e}$ and the new SA link graph $SA^{L,e}$ are merged to obtain an evolved software architecture $SA^e$, thereby implementing update of the software architecture SA.

Acquiring the new place graph $SA^{P,e}$ is specifically as follows:

The matching subgraph $G^P$ is cut from the place graph $SA^P$, a rest portion is recorded as $SA^P/G^P$, whether the place graph $R_j^P$ of the $R_j$ and the $G^P$ have an isomorphically cut boundary cluster is determined, and the $R_j^P$ is replaced to the $SA^P/G^P$ if yes to acquire the new SA place graph $SA^{P,e}$, or otherwise, replacement operation is not performed.

Acquiring the new link graph $SA^{P,e}$ is specifically as follows:

The matching subgraph $G^L$ is cut in the link graph $SA^L$, a rest portion is recorded as $SA^L/G^L$, whether the link graph $R_j^L$ of the $R_j$ and the $G^L$ have an isomorphically cut boundary cluster is determined, and the $R_j^L$ is replaced to the $SA^L/G^L$ if yes to acquire the new SA link graph $SA^{L,e}$, or otherwise, replacement operation is not performed.

The embodiment further provides a mobile system, which includes a basic structure and an information processing module; and the information processing module performs software update with the above-mentioned place change driven software update method.

The embodiment further provides an Internet-of-Things system, which includes a basic structure and an information processing module; and the information processing module performs software update with the above-mentioned place change driven software update method.

The embodiment further provides a cyber-physical system, which includes a basic structure and an information processing module; and the information processing module performs software update with the above-mentioned place change driven software update method.

The above describes the preferred specific embodiments of the present invention in detail. It is to be understood that many modifications and alterations may be made by those of ordinary skill in the art without any creative labor according to the concept of the present invention. Therefore, any technical solution that may be obtained by those skilled in the art through logic analysis, inference or limited experiments on the basis of the prior art according to the concept of the present invention should fall within the scope of protection determined by the claims.

What is claimed is:

1. A place change driven software update method for updating a software architecture SA, comprising the following steps:
    modeling the software architecture SA and a corresponding evolution rule set L⇒R through Bigraph, wherein the evolution rule set is a conversion process from one subgraph of the Bigraph to another subgraph of the Bigraph;
    acquiring, by the processor, a software architecture $SA^t$ after movement and before evolution of the software architecture SA;
    computing, by the processor, a place ΔP that changes between the SA and the $SA^t$; and acquiring a place set $\{\Delta P_1, \Delta P_2, \ldots, \Delta P_n\}$ for all change places in the evolution rule set L⇒R;
    determining, by the processor, whether the place ΔP belongs to the place set $\{\Delta P_1, \Delta P_2, \ldots, \Delta P_n\}$, and ending the method if no, or otherwise, acquiring a corresponding matching place $\Delta P_j$ of the place ΔP, thereby acquiring a corresponding evolution rule $L_j \rightarrow R_j$;
    respectively computing, by the processor, a place graph $L_j^P$ and a link graph $L_j^L$ according to the $L_j$, respectively computing a place graph $SA^P$ and a link graph $SA^L$ according to the software architecture SA, acquiring a matching subgraph $G^P$ of the place graph LP in the place graph $SA^P$, and acquiring a matching subgraph $G^L$ of the link graph $L_j^L$ in the link graph $SA^L$;
    respectively computing, by the processor, a place graph $R_j^P$ and a link graph $R_j^L$ according to the $R_j$, respectively cutting the matching subgraph $G^P$ on the place graph $SA^P$ with an isomorphically cut boundary cluster and replacing with the place graph $R_j^P$ to obtain a new $SA^{P,e}$ place graph $SA^{P,e}$, and cutting the matching subgraph $G^L$ on the link graph $SA^L$ and replacing with the link graph $R_j^L$ to obtain a new SA link graph $SA^{L,e}$; and
    merging, by the processor, the new SA place graph $SA^{P,e}$ and the new SA link graph $SA^{L,e}$ to obtain an evolved software architecture $SA^e$, thereby implementing, by the processor, update of the software architecture SA.

2. The place change driven software update method according to claim 1, wherein acquiring the new place graph $SA^{P,e}$ is specifically as follows:
    cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation.

3. The place change driven software update method according to claim 2, wherein acquiring the new place graph $SA^{P,e}$ is specifically as follows:
    cutting the matching subgraph $G^L$ from the link graph $SA^L$, labeling a rest portion as $SA^L/G^L$, determining whether the link graph $R_j^L$ of the $R_j$ and the $G^L$ have an isomorphically cut boundary cluster, and replacing the $R_j^L$ to the $SA^L/G^L$ if yes to acquire the new SA link graph $SA^{L,e}$, or otherwise, not performing replacement operation.

4. The place change driven software update method according to claim 1, wherein whether the evolution is triggered is determined with an ILER algorithm, thereby computing the place ΔP that changes between the SA and the $SA^t$.

5. A place change driven software update system for updating a software architecture SA, comprising:
    an evolution rule matching module, configured to: model the software architecture SA and a corresponding evolution rule set L⇒R through Bigraph, wherein the evolution rule set is a conversion process from one subgraph of the Bigraph to another subgraph of the Bigraph;
    acquire a software architecture $SA^t$ after movement and before evolution of the software architecture SA;
    compute a place ΔP that changes between the SA and the $SA^t$; and acquire a place set $\{\Delta P_1, \Delta P_2, \ldots, \Delta P_n\}$ for all change places in the corresponding evolution rule set L⇒R; and
    determine whether the place ΔP belongs to the place set $\{\Delta P_1, \Delta P_2, \ldots, \Delta P_n\}$, and end the method if no, or otherwise, acquire a corresponding matching place $\Delta P_j$ of the place ΔP, thereby acquiring a corresponding evolution rule $L_j \rightarrow R_j$;
    a place graph and link graph replacement module, configured to: respectively compute a place graph $L_j^P$ and a link graph $L_j^L$ according to the $L_j$, respectively compute a place graph $SA^P$ and a link graph $SA^L$ according to the software architecture SA, acquire a matching subgraph $G^P$ of the place graph $L_j^L$ in the place graph $SA^P$, and acquire a matching subgraph $G^L$ of the link graph $L_j^L$ in the link graph $SA^L$; and
    respectively compute a place graph $R_j^P$ and a link graph $R_j^L$ according to the $R_j$, respectively cut the matching subgraph $G^P$ on the place graph $SA^P$ with an isomorphically cutboundary cluster and replace with the place graph $R_j^P$ to obtain a new SA place graph $SA^{P,e}$, and cut the matching subgraph $G^L$ on the link graph $SA^L$ and replace with the link graph $R_j^L$ to obtain a new SA link graph $SA^{L,e}$; and
    a software update module, configured to: merge the new SA place graph $SA^{P,e}$ and the new SA link graph $SA^{L,e}$ to obtain an evolved software architecture $SA^e$, thereby implementing update of the software architecture SA,
    wherein the evolution rule matching module, the place graph and link graph replacement module, and the software update module are executed by a processor of the place change driven software update system.

6. The place change driven software update system according to claim 5, wherein acquiring the new place graph $SA^{P,e}$ is specifically as follows:
cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation.

7. The place change driven software update system according to claim 6, wherein acquiring the new link graph $SA^{P,e}$ is specifically as follows:
cutting the matching subgraph $G^L$ from the link graph $SA^L$, labeling a rest portion as $SA^L/G^L$, determining whether the link graph $R_j^L$ of the $R_j$ and the $G^L$ have an isomorphically cut boundary cluster, and replacing the $R_j^L$ to the $SA^L/G^L$ if yes to acquire the new SA link graph $SA^{L,e}$, or otherwise, not performing replacement operation.

8. The place change driven software update system according to claim 5, wherein whether the evolution is triggered is determined with an ILER algorithm, thereby computing the place $\Delta P$ that changes between the SA and the $SA^t$.

9. A non-transitory computer readable storage medium for updating a software architecture SA, storing a computer program thereon, wherein the computer program implements the following steps when executed by a processor:
modeling the software architecture SA and a corresponding evolution rule set $L \Rightarrow R$ through Bigraph, wherein the evolution rule set is a conversion process from one subgraph of the Bigraph to another subgraph of the Bigraph;
acquiring a software architecture $SA^t$ after movement and before evolution of the software architecture SA;
computing a place $\Delta P$ that changes between the SA and the $SA^t$; and acquiring a place set $\{\Delta P_1, \Delta P_2, \ldots, \Delta P_n\}$ for all change places in the corresponding evolution rule set $L \Rightarrow R$;
determining whether the place $\Delta P$ belongs to the place set $\{\Delta P_1, \Delta P_2, \ldots, \Delta P_n\}$, and ending the method if no, or otherwise, acquiring a corresponding matching place $\Delta P_j$ of the place $\Delta P$, thereby acquiring a corresponding evolution rule $L_j \rightarrow R_j$;
respectively computing a place graph $L_j^P$ and a link graph $L_j^L$ according to the $L_j$, respectively computing a place graph $SA^P$ and a link graph $SA^L$ according to the software architecture SA, acquiring a matching subgraph $G^P$ of the place graph $L_j^P$ in the place graph $SA^P$, and acquiring a matching subgraph $G^L$ of the link graph $L_j^L$ in the link graph $SA^L$;
respectively computing a place graph $R_j^P$ and a link graph $R_j^L$ according to the $R_j$, respectively cutting the matching subgraph $G^P$ on the place graph $SA^P$ with an isomorphically cut boundary cluster and replacing with the place graph $R_j^P$ to obtain a new SA place graph $SA^{P,e}$, and cutting the matching subgraph $G^L$ on the link graph $SA^L$ and replacing with the link graph $R_j^L$ to obtain a new SA link graph $SA^{L,e}$; and
merging the new SA place graph $SA^{P,e}$ and the new SA link graph $SA^{L,e}$ to obtain an evolved software architecture $SA^e$, thereby implementing update of the software architecture SA.

10. The non-transitory computer readable storage medium according to claim 9, wherein acquiring the new place graph $SA^{P,e}$ is specifically as follows:
cutting the matching subgraph $G^P$ from the place graph $SA^P$, labeling a rest portion as $SA^P/G^P$, determining whether the place graph $R_j^P$ of the $R_j$ and the $G^P$ have an isomorphically cut boundary cluster, and replacing the $R_j^P$ to the $SA^P/G^P$ if yes to acquire the new SA place graph $SA^{P,e}$, or otherwise, not performing replacement operation;
acquiring the new link graph $SA^{P,e}$ is specifically as follows:
cutting the matching subgraph $G^L$ from the link graph $SA^L$, labeling a rest portion as $SA^L/G^L$, determining whether the link graph $R_j^L$ of the $R_j$ and the $G^L$ have an isomorphically cut boundary cluster, and replacing the $R_j^L$ to the $SA^L/G^L$ if yes to acquire the new SA link graph $SA^{L,e}$, or otherwise, not performing replacement operation.

* * * * *